United States Patent
Jo et al.

(10) Patent No.: US 10,157,259 B2
(45) Date of Patent: Dec. 18, 2018

(54) METHOD AND DEVICE FOR PREDICTING RELIABILITY FAILURE RATE OF SEMICONDUCTOR INTEGRATED CIRCUIT AND METHOD OF MANUFACTURING THE SEMICONDUCTOR INTEGRATED CIRCUIT

(71) Applicant: SAMSUNG ELECTRONICS CO., LTD., Suwon-si, Gyeonggi-do (KR)

(72) Inventors: Jeong Min Jo, Seoul (KR); Yoo Hwan Kim, Suwon-si (KR); Hye Won Shim, Seoul (KR); Sang Woo Pae, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 100 days.

(21) Appl. No.: 15/407,365

(22) Filed: Jan. 17, 2017

(65) Prior Publication Data

US 2017/0206302 A1     Jul. 20, 2017

(30) Foreign Application Priority Data

Jan. 20, 2016     (KR) .................. 10-2016-0007263

(51) Int. Cl.
*G06F 17/50* (2006.01)
*G01R 31/28* (2006.01)

(52) U.S. Cl.
CPC ..... *G06F 17/5081* (2013.01); *G01R 31/2856* (2013.01); *G06F 17/5036* (2013.01); *G06F 2217/12* (2013.01)

(58) Field of Classification Search
CPC ............. G06F 17/5081; G06F 17/5036; G06F 2217/12; G01R 31/2856
(Continued)

(56) References Cited

U.S. PATENT DOCUMENTS 6,470,479 B1 * 10/2002 Yamamoto .......... G06F 17/5022
                                                            716/112
6,724,214 B2     4/2004 Manna et al.
(Continued)

FOREIGN PATENT DOCUMENTS

JP     2001274214 A     10/2001
JP     2003332399 A     11/2003
(Continued)

OTHER PUBLICATIONS

Li et al., "A New SPICE Reliability Simulation Method for Deep Submicrometer CMOS VLSI Circuits," IEEE Transactions on Device and Meterials Reliability, vol. 6, No. 2, Jun. 2006, pp. 247-257.

*Primary Examiner* — Sun Lin
(74) *Attorney, Agent, or Firm* — Volentine, Whitt & Francos, PLLC (57) ABSTRACT

A method for predicting a failure rate of a semiconductor integrated circuit includes receiving a circuit netlist corresponding to circuit defining data, which defines a connection relation, input, output, size, type and operating temperature of each transistor of a plurality of transistors included in the semiconductor integrated circuit. Low-risk transistors having a low-failure probability among the plurality of transistors are detected and filtered out based on the circuit netlist. Failure rates are calculated of respective high-risk transistors other than the low-risk transistors among the plurality of transistors. A total failure rate of the semiconductor integrated circuit is calculated based on the failure rates of the respective high-risk transistors.

20 Claims, 8 Drawing Sheets

(58) Field of Classification Search
USPC .................................................. 716/111, 112
See application file for complete search history.

(56) References Cited

U.S. PATENT DOCUMENTS

| | | | |
|---|---|---|---|
| 7,106,008 B2 | 9/2006 | Chu et al. | |
| 7,479,797 B2 | 1/2009 | Kim | |
| 7,701,237 B2 * | 4/2010 | Ohashi et al. | G01R 31/2856 257/48 |
| 8,082,534 B2 * | 12/2011 | Nozuyama | G01R 31/31835 702/117 |
| 8,195,697 B2 * | 6/2012 | Maeda et al. | G06F 17/5045 707/793 |
| 8,266,572 B2 | 9/2012 | Kim et al. | |
| 8,356,270 B2 | 1/2013 | Burd et al. | |
| 8,680,883 B2 | 3/2014 | Cho et al. | |
| 8,775,994 B2 | 7/2014 | Weir et al. | |
| 8,954,902 B2 | 2/2015 | Stuber et al. | |
| 9,429,618 B2 * | 8/2016 | Hwang | H03K 17/102 |
| 9,672,310 B1 * | 6/2017 | Oliva et al. | G06F 17/5068 |
| 2013/0294142 A1 | 11/2013 | Candelier et al. | |
| 2014/0095140 A1 | 4/2014 | Weir et al. | |
| 2014/0106481 A1 | 4/2014 | Lee et al. | |

FOREIGN PATENT DOCUMENTS

| | | |
|---|---|---|
| JP | 2006140284 A | 6/2006 |
| JP | 2009004678 A | 1/2009 |
| JP | 2010085354 A | 4/2010 |
| KR | 0640637 A | 10/2006 |
| KR | 20090027015 A | 3/2009 |

\* cited by examiner

METHOD AND DEVICE FOR PREDICTING RELIABILITY FAILURE RATE OF SEMICONDUCTOR INTEGRATED CIRCUIT AND METHOD OF MANUFACTURING THE SEMICONDUCTOR INTEGRATED CIRCUIT

CROSS-REFERENCE TO RELATED APPLICATIONS

This application claims priority under 35 U.S.C. § 119(a) from Korean Patent Application No. 10-2016-0007263 filed on Jan. 20, 2016, the disclosure of which is hereby incorporated by reference in its entirety.

BACKGROUND

Embodiments of the disclosure relate to a method of analyzing the reliability of a semiconductor circuit, and more particularly, to a method of predicting the failure rate of a circuit, thereby reducing simulation time.

With the increase of scaling and variation in semiconductor circuit processes, a reliability margin is decreasing. Accordingly, it is important to analyze various types of reliability parameters and design a circuit based on the analysis during circuit design. For instance, it is necessary to perform a reliability simulation during circuit design in order to reduce risks after the circuit is manufactured and to meet standard requirements so that a circuit is designed to conform to the standard. Simulation program with integrated circuit emphasis (SPICE) is a representative of simulation programs for electronic circuits.

Reliability simulations using SPICE are performed with regard to the area, operating voltage and temperature of every transistor in a circuit. At this time, the simulation takes a long time.

SUMMARY

According to some embodiments of the disclosure, there is provided a method of predicting a failure rate of a semiconductor integrated circuit. The method includes receiving a circuit netlist corresponding to circuit defining data, which defines a connection relation, input, output, size, type and operating temperature of each of a plurality of transistors included in the semiconductor integrated circuit. Low-risk transistors having a low-failure probability among the plurality of transistors are detected and filtered out based on the circuit netlist. Failure rates are calculated of respective high-risk transistors other than the low-risk transistors among the plurality of transistors. A total failure rate of the semiconductor integrated circuit is calculated based on the failure rates of the respective high-risk transistors.

According to other embodiments of the disclosure, there is provided a device for predicting a failure rate of a semiconductor integrated circuit. The device includes a memory configured to store a program code and a circuit netlist which defines a connection relation, input, output, size, type and operating temperature of each of a plurality of transistors included in the semiconductor integrated circuit. A processor executes the program code, detects low-risk transistors having a low-failure probability among the plurality of transistors based on the circuit netlist, and calculates failure rates of respective high-risk transistors other than the low-risk transistors among the plurality of transistors.

According to other embodiments of the disclosure, there is provided a method of manufacturing a semiconductor integrated circuit. The manufacturing method includes: a) receiving a circuit netlist defining connection relations among transistors of the semiconductor integrated circuit and an operating parameter of each of the transistors; b) identifying, among the transistors, high-risk transistors having high failure probabilities based on the operating parameters of the transistors defined by the circuit netlist; c) calculating a failure rate of each of the high-risk transistors; d) calculating a total failure rate of the semiconductor integrated circuit based on the calculated failure rates of the high-risk transistors; e) comparing the total failure rate to a reference value to determine whether the circuit netlist satisfies a design criterion; and f) manufacturing the semiconductor integrated circuit based upon the circuit netlist in response to determining that the circuit netlist satisfies the design criterion.

BRIEF DESCRIPTION OF THE DRAWINGS

The above and other features and advantages of the disclosure will become more apparent by describing in detail exemplary embodiments thereof with reference to the attached drawings in which.

DETAILED DESCRIPTION OF THE EMBODIMENTS

Figure 1:
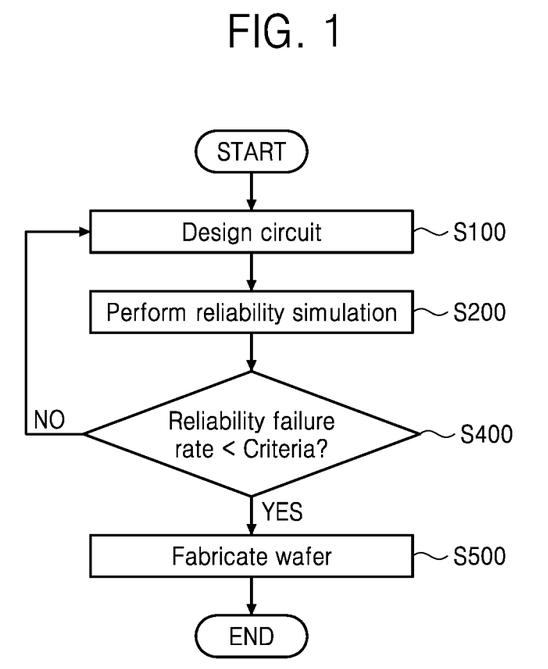
FIG. 1 is a flowchart of a method of verifying the design of a semiconductor integrated circuit according to some embodiments of the disclosure.

FIG. 1 is a flowchart of a method of verifying the design of a semiconductor integrated circuit according to some embodiments of the disclosure. Referring to FIG. 1, a reliability failure rate is predicted at the stage of designing a semiconductor integrated circuit (IC) and the design of the IC is modified according to the prediction result, so that the circuit with secured reliability can be fabricated.

In detail, a circuit is designed by a circuit designer in operation S100 and a reliability simulation is performed on the circuit in operation S200. A reliability failure rate may be calculated as the result of the reliability simulation.

The reliability failure rate may be compared with a predetermined criterion in operation S400. When the reliability failure rate is equal to or higher than the criterion (i.e., in case of NO) in operation S400, the method returns to operation S100. In other words, a procedure for (S100) modifying the circuit design, (S200) performing the reliability simulation on the circuit, and (S400) determining whether the reliability failure rate meets the criterion is repeated.

When the reliability failure rate is lower than the criterion (i.e., in case of YES) in operation S400, the circuit is finally fabricated in operation S500. Therefore, according to the embodiments of the disclosure, a circuit with a secured reliability is fabricated by using a method of predicting a reliability failure rate and modifying the design of an IC until the predicted result meets the predetermined criterion.

Hot carrier injection (HCI), bias temperature instability (BTI), and time dependent dielectric breakdown (TDDB) are representative parameters which determine the reliability duration of a transistor. TDDB is a parameter which features a TDDB failure of a MOS transistor. A failure rate may be predicted (or calculated) by performing a simulation using a simulation model for each of the parameters and simulation conditions may be changed or a circuit may be improved when the predicted (or calculated) failure rate is higher than a criterion value, so that a failure can be prevented at a design stage.

Figure 2:
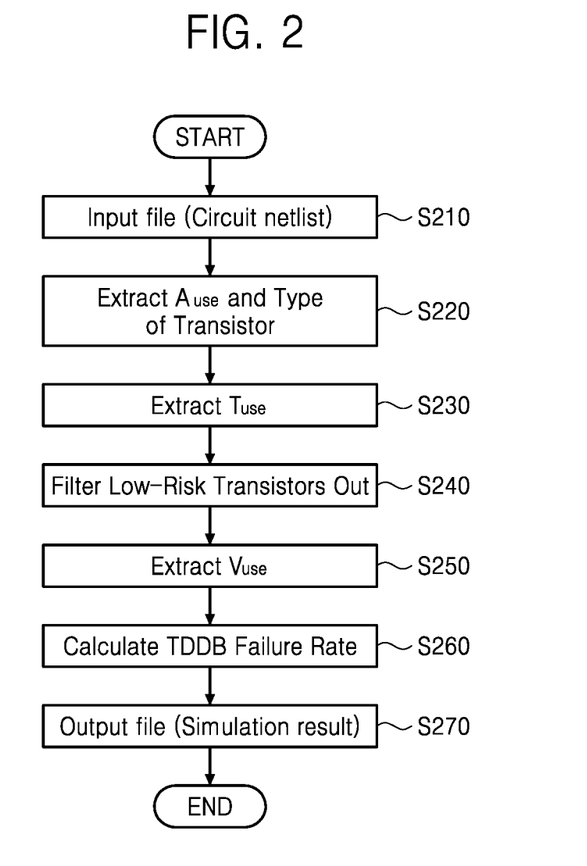
FIG. 2 is a flowchart of a method of predicting a failure rate according to some embodiments of the disclosure.

FIG. 2 is a flowchart of a method of predicting a failure rate according to some embodiments of the disclosure. FIG. 2 illustrates a method of predicting a TDDB failure rate, but the disclosure is not restricted to the current embodiments. The method may also be used to predict a different type of failure rate (e.g., an HCI failure rate or a BTI failure rate).

Referring to FIG. 2, a failure rate prediction device receives a circuit netlist necessary for a simulation in operation S210. The failure rate prediction device is also called a failure rate calculation device and is a device which predicts or calculates a failure rate by performing a simulation of a semiconductor circuit. The failure rate prediction device may include at least one processor which performs a simulation program. The structure and operations of the failure rate prediction device will be described with reference to FIG. 8 later.

The circuit netlist is data which defines the operating condition (e.g., an operating temperature) of a semiconductor circuit (hereinafter, referred to as a "target circuit" or a "circuit") subjected to the simulation and the connection relation, input signal, output signal, size (e.g., width and length of a transistor) and type (e.g., PMOS or NMOS) of each of transistors included in the target circuit. The circuit netlist may also be referred to as "circuit defining data." The circuit netlist may be input to or stored in the failure rate prediction device in a form of a file with a predetermined format.

An area $A_{use}$ and a type of each transistor during the operation of the circuit are calculated from the circuit netlist in operation S220. The area $A_{use}$ of the transistor may be calculated by extracting the width and length of the transistor. The type of the transistor may be divided into a P-channel metal oxide semiconductor (PMOS) transistor and an N-channel MOS (NMOS) transistor. An operating temperature $T_{use}$ is also calculated from the circuit netlist in operation S230. The operating temperature $T_{use}$ may be applied to all the transistors of the target circuit.

Thereafter, low-risk transistors are filtered in operation S240. In detail, low-risk transistors having a low failure probability are detected in the transistors of the target circuit based on the circuit netlist and filtered out. Whether a transistor is a low-risk transistor may be determined using a method described below.

Firstly, an operating voltage $V_{use}$ of the transistor is set to a maximum voltage $V_{max}$. The maximum voltage $V_{max}$ may be a highest voltage which is acceptable in circuit processes or applicable during the operation of the circuit. In other words, the maximum voltage $V_{use}$ is a voltage used in a worst case where a transistor operates in worst conditions.

Figure 3:
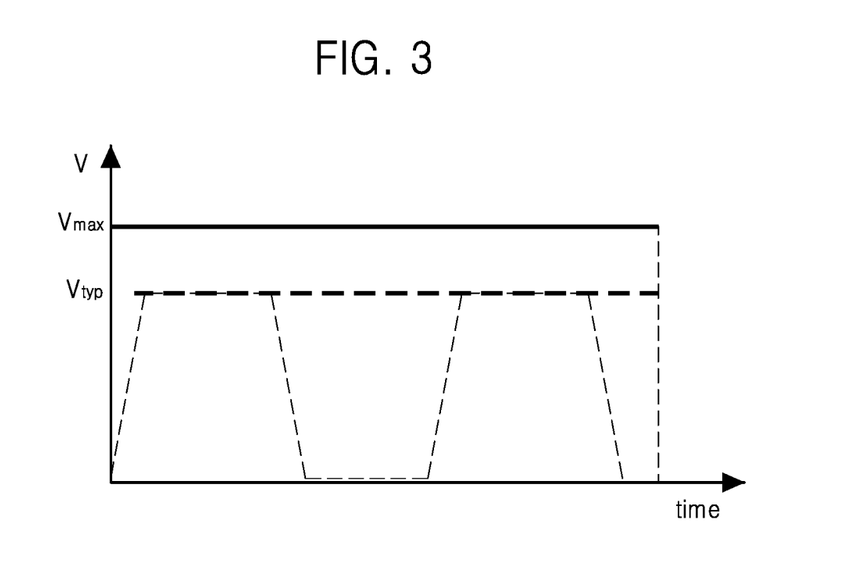
FIG. 3 is a schematic graph of a maximum voltage and a typical voltage according to some embodiments of the disclosure.

FIG. 3 is a schematic graph of the maximum voltage $V_{max}$ and a typical voltage $V_{typ}$ according to some embodiments of the disclosure. Referring to FIG. 3, the maximum voltage $V_{max}$ may be a fixed voltage which has been set in advance.

A failure rate $F_{tr}$ of the transistor is calculated with the operating voltage $V_{use}$ set to the maximum voltage $V_{max}$. The failure rate $F_{tr}$ is calculated using a predetermined equation or algorithm. The failure rate $F_{tr}$ calculated with the operating voltage $V_{use}$ set to the maximum voltage $V_{max}$ is referred to as a worst-case failure rate or maximum failure rate of the transistor.

When a maximum failure rate $F_{tr,max}$ is lower than a failure rate limit (hereinafter, referred to as a first target failure rate $F_{target}$, the transistor is determined as a low-risk transistor. When the maximum failure rate $F_{tr,max}$ is equal to or higher than the first target failure rate $F_{target}$, the transistor is not a low-risk transistor. Accordingly, the operating voltage $V_{use}$ is computed from the circuit netlist in operation S250.

Figure 4:
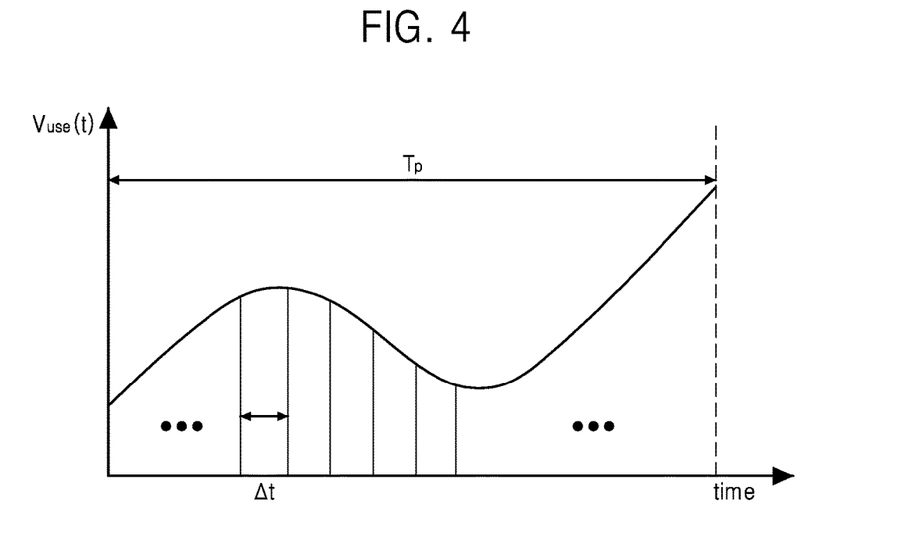
FIG. 4 is a diagram of the waveform of an operating voltage according to some embodiments of the disclosure.

FIG. 4 is a diagram of the waveform of the operating voltage $V_{use}$ according to some embodiments of the disclosure. Referring to FIG. 4, the operating voltage $V_{use}$ may change over time and may be computed a plurality of times during a predetermined period $T_p$. The operating voltage $V_{use}$ may be a gate voltage of a transistor. A voltage at a gate of a transistor may be compared with a threshold voltage (Vth) at intervals of a predetermined minute time Δt to determine an operating mode (e.g., an inversion mode or an accumulation mode) of the transistor and a larger value between a gate-source potential difference and a gate-drain potential difference may be determined as the operating voltage $V_{use}$ according to the operating mode. In detail, the operating voltage $V_{use}$ of a transistor may be computed using a method described below.

Figure 5A:
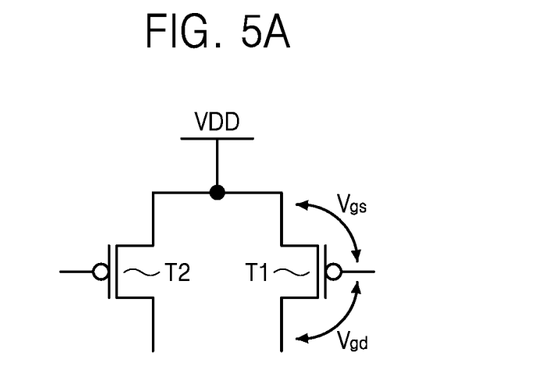
FIGS. 5A and 5B are diagrams illustrating the gate-source voltage and gate-drain voltage of a P-channel metal oxide semiconductor (PMOS) transistor and an N-channel MOS (NMOS) transistor, respectively.
Figure 5B:
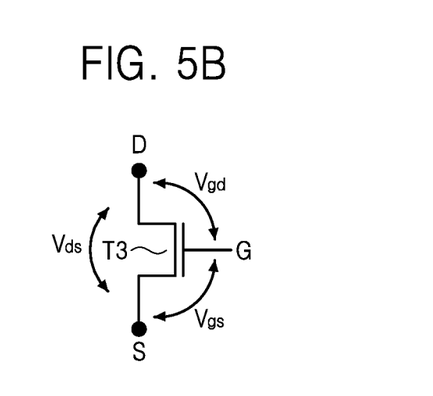

Firstly, a gate-to-source voltage $V_{gs}$ and a gate-to-drain voltage $V_{gd}$ of the transistor are extracted. FIGS. 5A and 5B are diagrams illustrating the gate-to-source voltage $V_{gs}$ and the gate-to-drain voltage $V_{gd}$ of PMOS transistors T1 and T2 and an NMOS transistor T3.

For a PMOS transistor, whether the gate-to-source voltage $V_{gs}$ is at least the Vth is determined and whether the gate-to-drain voltage $V_{gd}$ is at least the Vth is determined. When any one of the gate-to-source voltage $V_{gs}$ and the gate-to-drain voltage $V_{gd}$ is at least the Vth, the operating mode of the transistor is set to the inversion mode and the greater one between the gate-to-source voltage $V_{gs}$ and the gate-to-drain voltage $V_{gd}$ is set as the operating voltage $V_{use}$. When both of the gate-to-source voltage $V_{gs}$ and the gate-to-drain voltage $V_{gd}$ are less than the Vth, the operating mode of the transistor is set to the accumulation mode and the greater one between the absolute value of the gate-to-source voltage $V_{gs}$ and the absolute value of the gate-to-drain voltage $V_{gd}$ is set as the operating voltage $V_{use}$.

For an NMOS transistor, whether the gate-to-source voltage $V_{gs}$ is at most the Vth is determined and whether the gate-to-drain voltage $V_{gd}$ is at most the Vth is determined. When any one of the gate-to-source voltage $V_{gs}$ and the gate-to-drain voltage $V_{gd}$ is at most the Vth, the operating mode of the transistor is set to the inversion mode and the lesser value between the gate-to-source voltage $V_{gs}$ and the gate-to-drain voltage $V_{gd}$ is set as the operating voltage $V_{use}$. When both of the gate-to-source voltage $V_{gs}$ and the gate-to-drain voltage $V_{gd}$ are greater than the Vth, the operating mode of the transistor is set to the accumulation mode and the greater value between the gate-to-source voltage $V_{gs}$ and the gate-to-drain voltage $V_{gd}$ is set as the operating voltage $V_{use}$.

The operating voltage $V_{use}$ may be computed using the above-described method at intervals of the predetermined minute time $\Delta t$ during the predetermined period $T_p$. The waveform of the operating voltage $V_{use}$ computed at intervals of the minute time $\Delta t$ may appear as illustrated in FIG. 4. In other words, the operating voltage $V_{use}$ which changes over time may be obtained, as shown in FIG. 4.

A failure rate factor Fa(t) corresponding to each minute time $\Delta t$ may be calculated using the operating voltage $V_{use}$ computed at intervals of the minute time $\Delta t$ and the failure rate (e.g., TDDB failure rate) $F_{tr}$ of the transistor may be calculated using the failure rate factor Fa(t) at each minute time $\Delta t$ in operation S260. The calculation of the failure rate factor Fa(t) using the operating voltage $V_{use}$ and the calculation of the failure rate $F_{tr}$ using the failure rate factor Fa(t) may be performed using a predetermined equation or algorithm.

As described above, a failure rate is calculated based on a plurality of operating voltages computed at minute time intervals with respect to each high-risk transistor (i.e., a transistor which is not a low-risk transistor). Accordingly, it may take a long time to compute the waveform of the operating voltage $V_{use}$ illustrated in FIG. 4.

Meanwhile, as for a low-risk transistor, a failure rate may be calculated on an assumption that the typical voltage $V_{typ}$ is applied to the gate of the transistor during the predetermined period $T_p$, as shown in FIG. 3. In other words, the failure rate may be calculated on an assumption that the operating voltage $V_{use}$ of a low-risk transistor is the typical voltage $V_{typ}$. The typical voltage $V_{typ}$ is a voltage at which a target circuit usually operates and may be lower than the maximum voltage $V_{max}$. As shown in FIG. 3, the typical voltage $V_{typ}$ may be a predetermined fixed voltage. Accordingly, for a low-risk transistor, the waveform illustrated in FIG. 4 may not be computed, but a failure rate may be calculated based on the typical voltage $V_{typ}$, so that it may take less time to calculate the failure rate as compared to a high-risk transistor.

Operations S220 through S260 may be performed on all transistors included in a target circuit. For convenience sake in the description, it is assumed that the number of transistors included in the target circuit is N which is a natural number of at least 2. Each of the N transistors included in the target circuit may be classified into either a high-risk transistor or a low-risk transistor. It is assumed that the number of high-risk transistors among the N transistors is P and the number of low-risk transistors among the N transistors is N−P. At this time, a total failure rate $F_{total}$ of the N transistors, i.e., a failure rate of the target circuit may be calculated using Equation 1:

$$F_{total} = \Sigma_{j=1}^{N} F_{tr,j} \cong \Sigma_{k=1}^{P} F_{tr,k} + F_{tr,total} \text{ [unit: ppm]}, \quad (1)$$

where $F_{tr,j}$ is a failure rate of a j-th transistor among the N transistors, $F_{tr,k}$ is a failure rate of a k-th high-risk transistor among the P high-risk transistors, and $F_{tr,total}$ is a total failure rate of (N−P) low-risk transistors. $F_{tr,total}$ may be calculated by the failure rates of the accumulating respective (N−P) low-risk transistors.

A simulation result including the failure rate of the target circuit may be output in a file format in operation S270.

Figure 6:
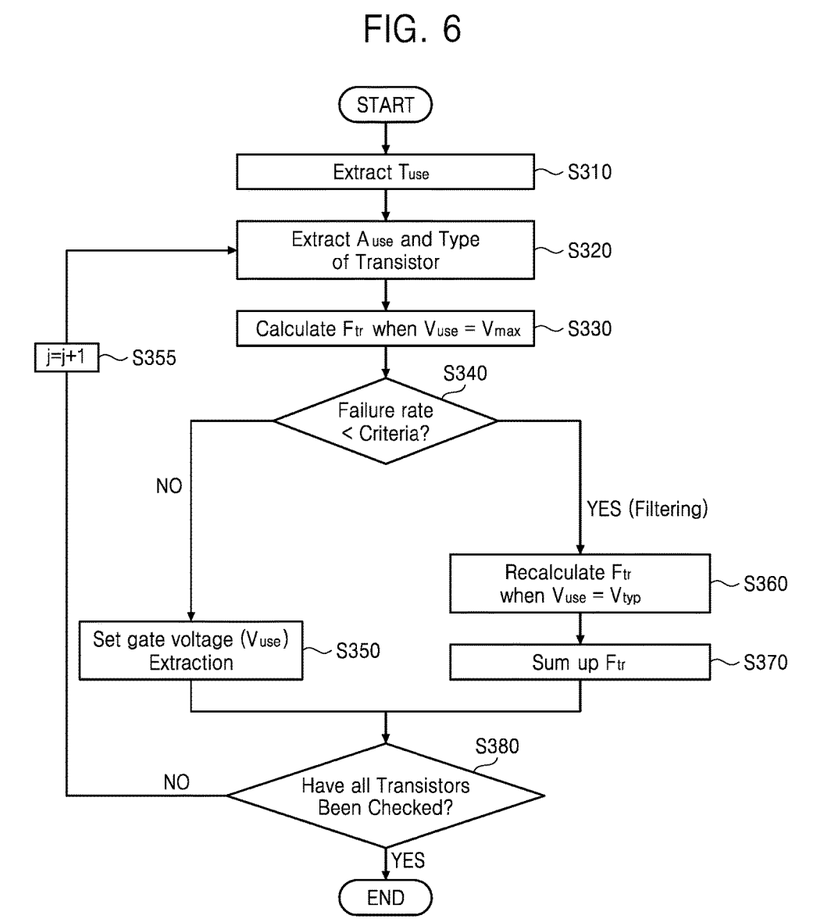
FIG. 6 is a flowchart of a method of predicting a failure rate according to other embodiments of the disclosure.

FIG. 6 is a flowchart of a method of predicting a failure rate according to other embodiments of the disclosure. Although a method of predicting a TDDB failure rate is illustrated in FIG. 6, the disclosure is not restricted to the current embodiments. The method may also be used to predict a different type of failure rate (e.g., an HCI failure rate or a BTI failure rate). The method illustrated in FIG. 6 may be performed by a failure rate prediction device which will be described later. The method illustrated in FIG. 6 is similar to the method illustrated in FIG. 2. To avoid redundancy, the description made above with reference to FIG. 2 will be omitted.

Referring to FIG. 6, the operating temperature $T_{use}$ is calculated in operation S310. The operating temperature $T_{use}$ may be extracted from the circuit operating conditions in the circuit netlist, as described above. The circuit netlist may be input to or stored in the failure rate prediction device in a predetermined file format. The operating temperature $T_{use}$ may be applied to all the transistors of the target circuit. A variable "j" for identifying a target transistor may be initialized to "1" before operation S320 in other embodiments.

The area $A_{use}$ and a type of the first transistor (i.e., transistor j=1) are calculated in operation S320. Operation S320 is the same as operation S220, thus the detailed description is omitted.

The operating voltage $V_{use}$ of the transistor is set to the maximum voltage $V_{max}$ and a failure rate $F_{tr}$ of the transistor at the worst case (i.e., a maximum failure rate) is calculated in operation S330. The maximum failure rate $F_{tr}$ is compared with the first target failure rate $F_{target}$ in operation S340.

When the maximum failure rate $F_{tr}$ is lower than the first target failure rate $F_{target}$ (i.e., in case of YES) in operation S340, the current transistor is determined to be a low-risk transistor. Accordingly, the operating voltage $V_{use}$ of the transistor is set to the typical voltage $V_{typ}$ and the typical failure rate $F_{tr}$ of the transistor is re-calculated in operation S360. Thereafter, the typical failure rates $F_{tr}$ for all low-risk transistors are accumulated in operation S370.

When the maximum failure rate $F_{tr}$ is not lower than the first target failure rate $F_{target}$ (i.e., in case of NO) in operation S340, the current transistor is determined as a high-risk transistor. Accordingly, a configuration necessary to calculate the operating voltage $V_{use}$ of the transistor at intervals of the minute time $\Delta t$ during the predetermined period $T_p$ is set in operation S350. Commands for computing the waveform of the operating voltage $V_{use}$ of the transistor may be set in operation S350. The failure rate prediction device may interpret the commands, compute the waveform of the operating voltage $V_{use}$ of the high-risk transistor, and calculate the failure rate of the high-risk transistor using the waveform of the operating voltage $V_{use}$. The waveform of the operating voltage $V_{use}$ over time, as illustrated in FIG. 4, may be computed in operation S350. The failure rate of the transistor may be calculated based on a plurality of operating voltages calculated at intervals of the minute time $\Delta t$ in operation S350. Similar to operation S370, the failure rates of respective high-risk transistors may be summed up in operation S350.

Thereafter, whether a failure rate has been calculated with respect to every transistor in the target circuit is determined in operation S380. In detail, "j" may be compared with N which is the number of all transistors included in the target circuit in order to determine whether a failure rate has been calculated with respect to every transistor. When it is determined that any transistor is left (i.e., in case of NO) in operation S380, "j" is increased by 1 in operation S355 and the method is repeated from operation S320. In other words, operations S320 through S380 may be repeated until failure rates of all transistors included in the target circuit are calculated. When the failure rates of all transistors are calculated, the failure rate of the target circuit, i.e., the total failure rate $F_{total}$ may be calculated using Equation 1.

Figure 7:
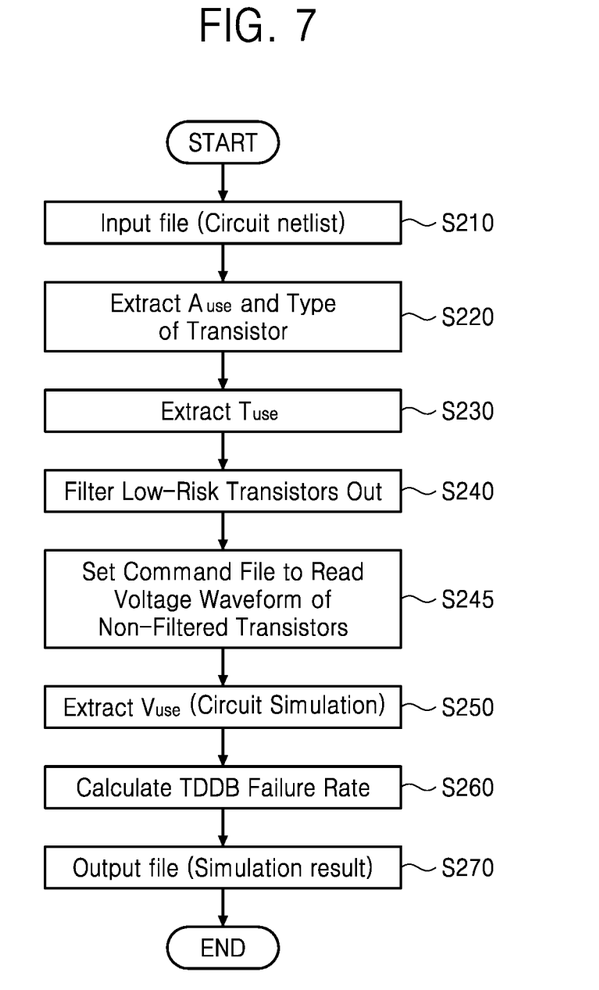
FIG. 7 is a flowchart of a method of predicting a failure rate according to further embodiments of the disclosure.

FIG. 7 is a flowchart of a method of predicting a failure rate according to further embodiments of the disclosure. The method illustrated in FIG. 7 may be performed by the failure rate prediction device which will be described later. The method illustrated in FIG. 7 is similar to the method illustrated in FIG. 2. Thus, to avoid redundancy, the description will be focused on the differences between the methods.

Referring to FIGS. 2 and 7, the method illustrated in FIG. 7 may further include an operation S245 of setting a command file for computing the waveform of the operating voltage $V_{use}$ of a high-risk transistor as compared to the method illustrated in FIG. 2. The failure rate prediction device (1 in FIG. 8) may calculate the failure rate $F_{total}$ of the target circuit using at least two simulators. The at least two simulators may include a first simulator which classifies each of the transistors included in the target circuit as either a low-risk transistor or a high-risk transistor and a second simulator which computes the waveform of the operating voltage $V_{use}$ and calculates a failure rate.

The first simulator may perform operations S210 through S240 to classify each of the transistors in the target circuit as either a low-risk transistor or a high-risk transistor. The first simulator may also generate the command file for computing the waveform of the operating voltage $V_{use}$ of transistors classified as high-risk transistors in operation S245. The command file may include information for identifying the transistors classified as high-risk transistors. The command file may be used as an input file of the second simulator.

The second simulator may compute the waveform of the operating voltage $V_{use}$ of each high-risk transistor based on the command file in operation S250. The second simulator may also calculate the failure rate (e.g., TDDB failure rate) $F_{tr}$ of the high-risk transistor using the operating voltage $V_{use}$ in operation S260. For a low-risk transistor, a failure rate may be calculated based on an assumption that the typical voltage $V_{typ}$ is applied to the gate of the transistor during the predetermined period $T_p$, as shown in FIG. 3. The total failure rate $F_{total}$ of N transistors, i.e., the failure rate of the target circuit may be calculated using Equation 1.

Figure 8:
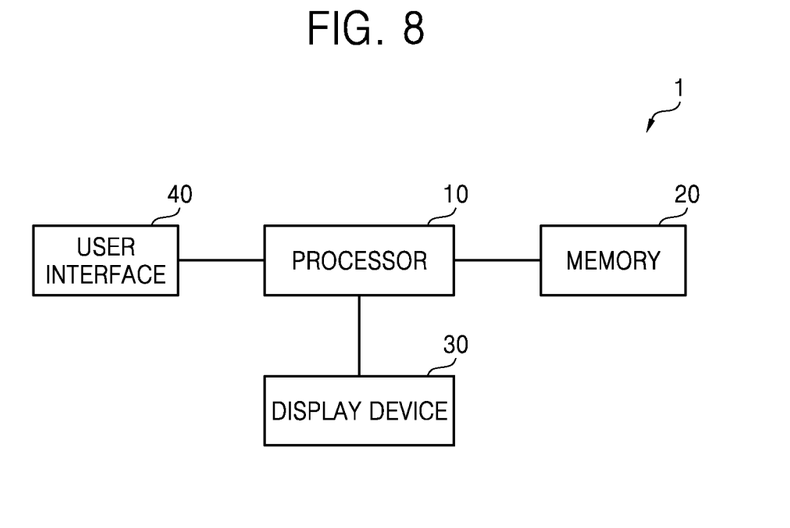
FIG. 8 is a block diagram of a failure rate prediction device according to some embodiments of the disclosure.

FIG. 8 is a block diagram of the failure rate prediction device 1 according to some embodiments of the disclosure. Referring to FIG. 8, the failure rate prediction device 1 may be implemented as a computer such as a personal computer (PC), a tablet computer, or a server. The failure rate prediction device 1 may include a processor 10, a memory 20, a display device 30, and a user interface 40.

The processor 10 controls the overall operation of the failure rate prediction device 1. The processor 10 may process or execute programs and/or data stored in the memory 20. For instance, the processor 10 may execute a simulation program stored in the memory 20 to perform the method of predicting a failure rate of a semiconductor IC according to the embodiments of the disclosure described with reference to FIGS. 2 through 7 above. The processor 10 may also read a circuit netlist file from the memory 20 and control the circuit netlist file to be used as an input of the simulation program.

The processor 10 may be implemented as a multi-core processor. The multi-core processor is a single computing component with two or more independent actual processors (referred to as cores). Each of the processors may read and execute program instructions. The processor 10 may be called a controller, a microcontroller, a microprocessor, a microcomputer, or an application processor. The processor 10 may be implemented in hardware, firmware, software, or a combination thereof.

The memory 20 may store a program (e.g., a simulator) and data (e.g., a circuit netlist) used to perform a method of predicting a failure rate of a semiconductor IC according to some embodiments of the disclosure. The memory 20 may be formed of non-volatile memory, volatile memory, or a combination thereof. The memory 20 may include read-only memory (ROM) (not shown), random access memory (RAM) (not shown), and a storage device (not shown).

The ROM may store permanent programs and/or data. The ROM may be implemented as erasable programmable ROM (EPROM) or electrically erasable programmable ROM (EEPROM).

The RAM may temporarily store programs, data, or instructions. The programs and/or data stored in the storage device may be temporarily stored in the RAM according to the control of the processor 10 or a booting code stored in the ROM. The RAM may be implemented as dynamic RAM (DRAM) or static RAM (SRAM).

The user interface 40 is a device which allows a user of the failure rate prediction device 1 to interface with the failure rate prediction device 1. The user interface 40 may include various types of input devices such as a button, a keypad, a dial, a touch screen, an audio input interface, an image/video input interface, and a sensor data input interface.

The display device 30 may display image/video signals to a user according to the control of the processor 10. The display device 30 may output data and/or results (e.g., simulation results) while a method of predicting a failure rate according to some embodiments is being performed.

The failure rate prediction result PR calculated by the failure rate prediction device 1 may be transmitted to the circuit design device 3. For example, the reliability failure rate data PR calculated by the failure rate prediction device 1 or result data PR obtained by comparing the reliability failure rate with the predetermined criterion can be transmitted to the circuit design device 3.

The circuit design device 3 is a device for designing a circuit or modifying a designed circuit, and may have a configuration similar to those of the failure rate prediction device 1. The circuit design device 3 can modify the circuit design based on the failure rate prediction result PR. For example, the circuit design device 3 can perform circuit design using a specific tool (e.g., CAD: Computer Aided Design) for circuit design. The circuit design device 3 can modify the connection relationship, input, output or layout of the circuit elements based on the failure rate prediction result PR.

The circuit design device 3 may provide a modified circuit design result CDR to the failure rate prediction device 1. For example, if the circuit design is modified by the circuit design device 3, the circuit netlist is modified. Thus, the failure rate prediction device 1 predicts the reliability failure rate again based on the modified circuit netlist, and when the re-predicted reliability failure rate satisfies the predetermined criterion, the designed circuit is finally fabricated.

As described above, according to some embodiments of the disclosure, the execution time of a simulation is reduced without a decrease of the accuracy of the simulation when an operating voltage at each node in a circuit is calculated and reliability (i.e., duration, e.g., TDDB) and a failure rate (ppm) are calculated using the operating voltage. Since a TDDB failure probability increases as the area of gate oxide of a transistor increases in a circuit, a maximum failure rate is calculated in a worst case and a low-risk transistor is filtered out based on the maximum failure rate. Since verification is performed focusing on high-risk transistors, simulation time is reduced and fast feedback is given to a design, so that time (e.g., design and simulation time) taken before a circuit is actually fabricated is reduced. As a result, circuit design and fabrication costs are reduced.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

While the disclosure has been particularly shown and described with reference to exemplary embodiments thereof, it will be understood by those of ordinary skill in the art that various changes in forms and details may be made therein without departing from the spirit and scope of the disclosure as defined by the following claims.

What is claimed is:

1. A method of predicting a failure rate of a semiconductor integrated circuit, the method comprising:
    receiving a circuit netlist corresponding to circuit defining data which defines a connection relation, an input, an output, a size, a type, and an operating temperature of each transistor of a plurality of transistors comprised in the semiconductor integrated circuit;
    detecting and filtering out low-risk transistors having a low failure probability among the plurality of transistors based on the circuit netlist;
    calculating failure rates of respective high-risk transistors other than the low-risk transistors among the plurality of transistors; and
    calculating a total failure rate of the semiconductor integrated circuit based on the failure rates of the respective high-risk transistors.

2. The method of claim 1, wherein the detecting low-risk transistors comprises:
    extracting the operating temperature of a first transistor among the plurality of transistors from the circuit netlist;
    extracting the size and the type of the first transistor from the circuit netlist;
    setting an operating voltage of the first transistor to a predetermined maximum voltage and calculating a maximum failure rate of the first transistor; and
    determining the first transistor as a low-risk transistor when the maximum failure rate of the first transistor is at most a first target failure rate.

3. The method of claim 2, further comprising:
    setting the operating voltage of the first transistor to a predetermined typical voltage and calculating a typical failure rate of the first transistor; and
    calculating a failure rate of the low-risk transistor based on the typical failure rate of the first transistor.

4. The method of claim 3, wherein the operating voltage of the first transistor is a voltage which is applied to a gate of the first transistor and the predetermined typical voltage is lower than the predetermined maximum voltage.

5. The method of claim 1, wherein the calculating failure rates of respective high-risk transistors comprises:
    predicting an operating voltage of a first high-risk transistor among the respective high-risk transistors a plurality of times during a predetermined period; and
    calculating a failure rate of the first high-risk transistor using the operating voltages of the first high-risk transistor which have been predicted.

6. The method of claim 5, wherein the predicting the operating voltage of a first high-risk transistor a plurality of times during a predetermined period comprises:
    comparing a voltage at a gate of the first high-risk transistor with a threshold voltage at intervals of a predetermined minute time during the predetermined period according to the type of the first high-risk transistor;
    determining an operating mode of the first high-risk transistor according to a comparison result; and
    determining the operating voltage according to the operating mode.

7. The method of claim 6, wherein the calculating a failure rate of the first high-risk transistor comprises:
    calculating a failure rate factor corresponding to each minute time using the operating voltage calculated at intervals of said each minute time; and
    calculating the failure rate of first high-risk transistor using the failure rate factor at each interval of said each minute time.

8. The method of claim 1, wherein the calculating a total failure rate of the semiconductor integrated circuit comprises:
    setting an operating voltage of each low-risk transistor of the low-risk transistors to a predetermined fixed voltage and calculating a failure rate of said each low-risk transistor;
    computing a waveform of the operating voltage of each high-risk transistor of the high-risk transistors, which changes over time, and calculating the failure rate of said each high-risk transistor based on the waveform of the operating voltage; and
    summing up the failure rates of the low-risk transistors and the failure rates of the high-risk transistors.

9. The method of claim 8, further comprising setting a command file for computing the waveform of the operating voltage of each high-risk transistor.

10. A non-transitory computer-readable recording medium for recording a program, executable by a processor, for executing the method of claim 1.

11. A device for predicting a failure rate of a semiconductor integrated circuit, the device comprising:
    a memory configured to store a program code and a circuit netlist which defines a connection relation, an input, an output, a size, a type, and an operating temperature of each transistor of a plurality of transistors comprised in the semiconductor integrated circuit; and
    a processor configured to execute the program code, detect low-risk transistors having a low failure probability among the plurality of transistors based on the circuit netlist, and calculate failure rates of respective high-risk transistors other than the low-risk transistors among the plurality of transistors, wherein the processor:

sets an operating voltage of each transistor of the plurality of transistors to a first predetermined fixed voltage, calculates a maximum failure rate of said each transistor, and determines that said each transistor is a low-risk transistor when the maximum failure rate is at most a first target failure rate.

12. The device of claim 11, wherein the processor:

sets the operating voltage of each low-risk transistor of the low-risk transistors to a second predetermined fixed voltage, calculates a failure rate of said each low-risk transistor, computes a waveform of the operating voltage of each high-risk transistor of the high-risk transistors, which changes over time, and calculates the failure rate of said each high-risk transistor based on the waveform of the operating voltage which has been computed.

13. The device of claim 12, wherein the processor sums up the failure rates of the respective low-risk transistors and the failure rates of the respective high-risk transistors to calculate a total failure rate of the semiconductor integrated circuit.

14. The device of claim 12, wherein the operating voltage is a voltage which is applied to a gate of each transistor of the plurality of transistors and the second predetermined fixed voltage is lower than the first predetermined fixed voltage.

15. The device of claim 12, wherein the processor:

compares a voltage at a gate of each high-risk transistor of the high-risk transistors with a threshold voltage according to the type of said each high-risk transistor, determines an operating mode of said high-risk transistor according to a comparison result, and determines the operating voltage according to the operating mode.

16. A method of manufacturing a semiconductor integrated circuit, the method comprising:

a) receiving a circuit netlist defining connection relations among transistors of the semiconductor integrated circuit and an operating parameter of each transistor of the transistors;

b) identifying, among the transistors, high-risk transistors having high failure probabilities based on the operating parameters of the transistors defined by the circuit netlist;

c) calculating a failure rate of each high-risk transistor of the high-risk transistors;

d) calculating a total failure rate of the semiconductor integrated circuit based on the calculated failure rates of the high-risk transistors;

e) comparing the total failure rate to a reference value to determine whether the circuit netlist satisfies a design criterion; and f) manufacturing the semiconductor integrated circuit based upon the circuit netlist in response to determining that the circuit netlist satisfies the design criterion.

17. The method of claim 16 further comprising:

g) revising the circuit netlist to improve a prospective reliability of the semiconductor integrated circuit in response to determining that the circuit netlist does not satisfy the design criterion; and h) repeating operations (a) through (f) with the revised circuit netlist substituted for the circuit netlist.

18. The method of claim 16, wherein the identifying high-risk transistors comprises:

calculating a maximum failure rate of a first transistor, among the transistors, based upon a predetermined operating voltage and an operating temperature, a size, and a type of the first transistor identified within the circuit netlist; and determining the first transistor as a high-risk transistor when the calculated maximum failure rate of the first transistor exceeds a target failure rate.

19. The method of claim 16, wherein the calculating a total failure rate of the semiconductor integrated circuit comprises:

computing, for each high-risk transistor of the high-risk transistors, a time-varying waveform of an operating voltage of said each high-risk transistor;

calculating, for each high-risk transistor of the high-risk transistors, the failure rate of said each high-risk transistor based on the computed time-varying waveform of the operating voltage waveform for said each high-risk transistor; and summing the calculated failure rates of the high-risk transistors.

20. The method of claim 19, wherein the calculating a total failure rate of the semiconductor integrated circuit further comprises:

identifying low-risk transistors as the remainder of the transistors that are not identified as the high-risk transistors;

calculating, for each low-risk transistor of the low-risk transistors, a failure rate of said each low-risk transistor based upon an application of a predetermined operating voltage to said each low-risk transistor;

summing the calculated failure rates of the low-risk transistors; and adding the summed failure rates of the low-risk transistors and the summed failure rates of the high-risk transistors.

* * * * *